Sept. 21, 1954    A. H. BALLER    2,689,751
BOOK NOVELTY
Filed March 16, 1951    4 Sheets-Sheet 1
Fig. 1.
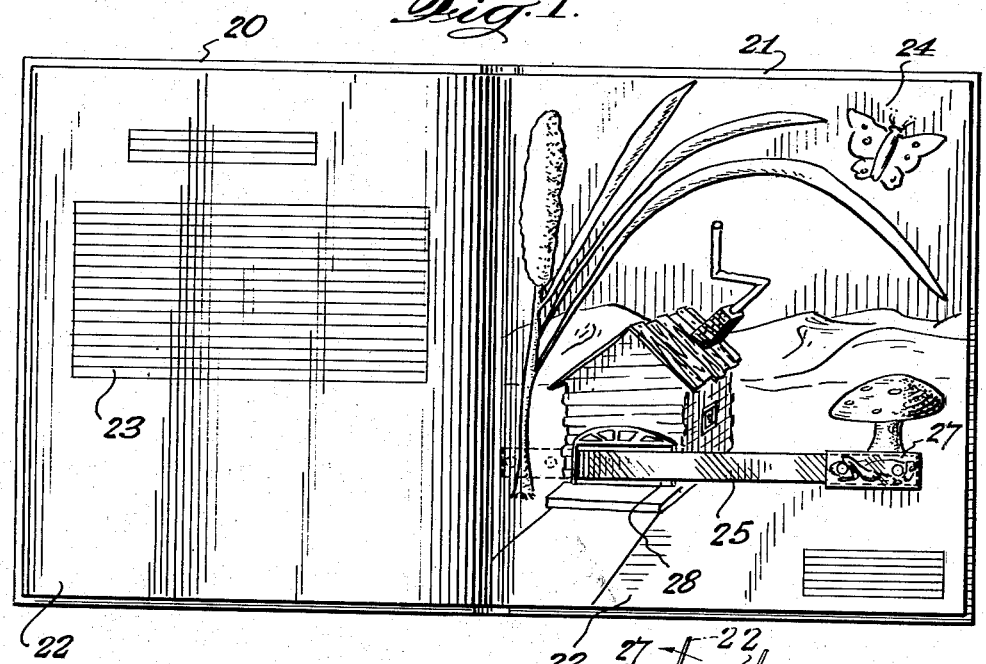
Fig. 2.
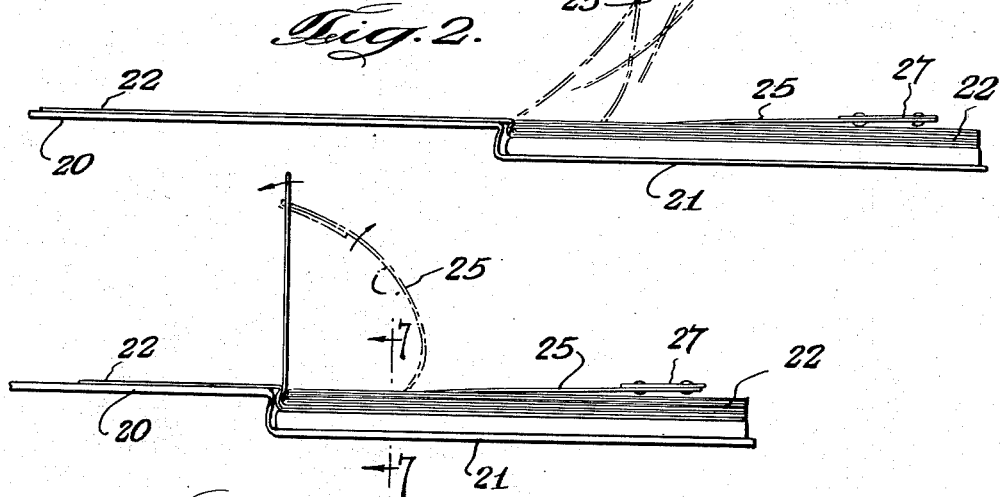
Fig. 3.
Inventor
Albert H. Baller
By
Attorneys Sept. 21, 1954    A. H. BALLER    2,689,751
BOOK NOVELTY
Filed March 16, 1951    4 Sheets-Sheet 2
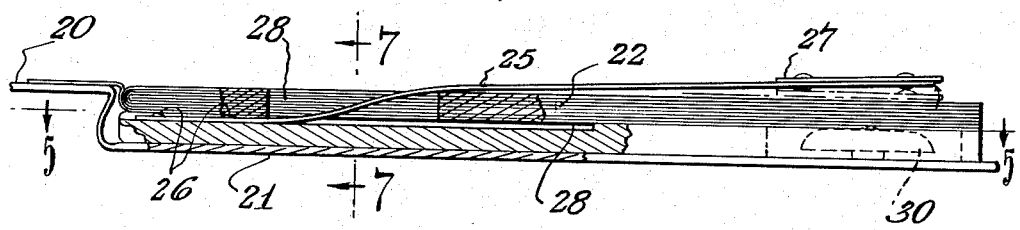
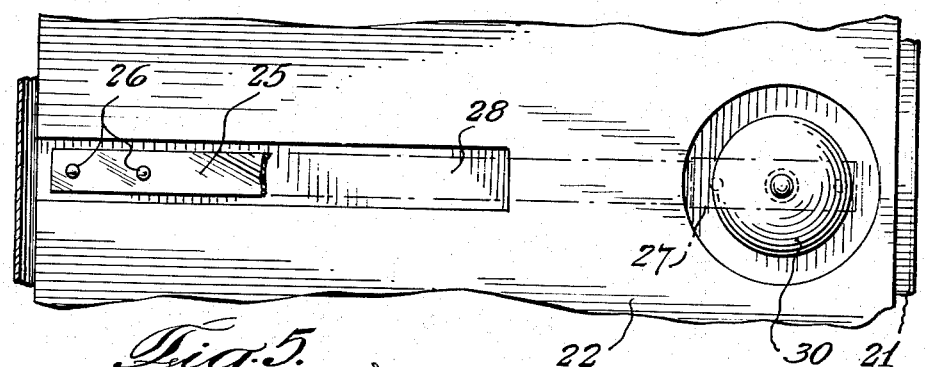
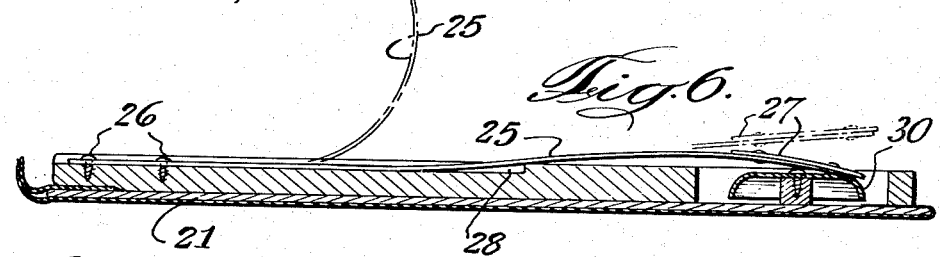
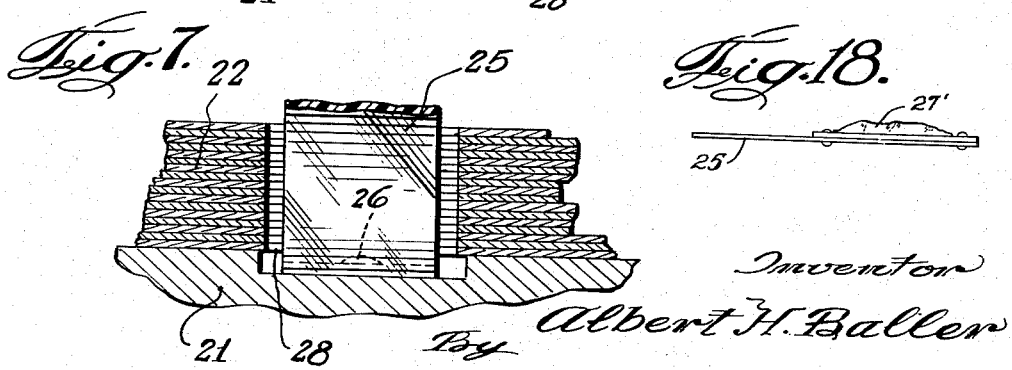

Sept. 21, 1954  A. H. BALLER  2,689,751
BOOK NOVELTY
Filed March 16, 1951  4 Sheets-Sheet 3
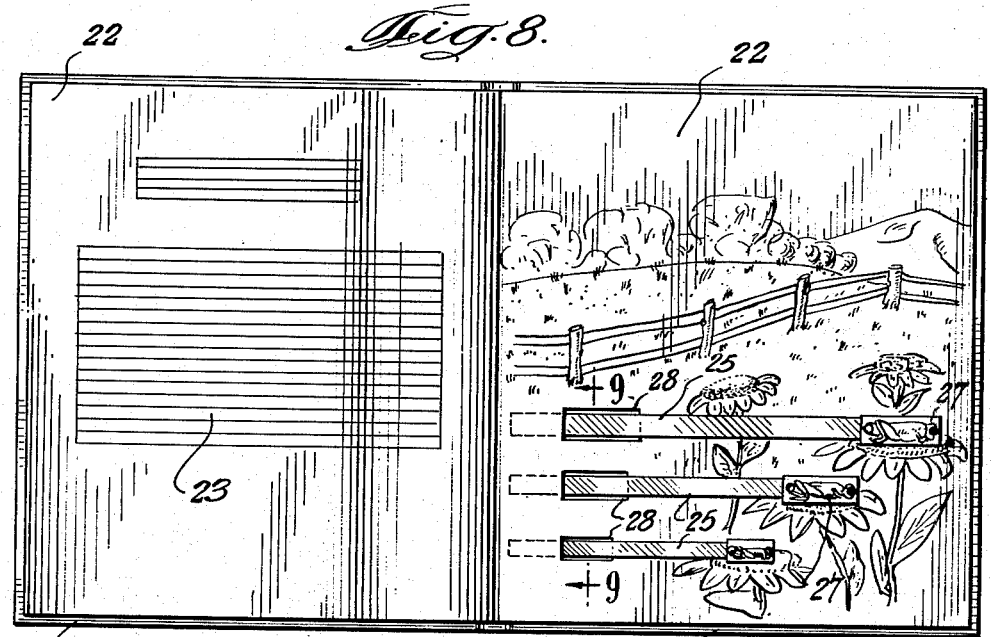
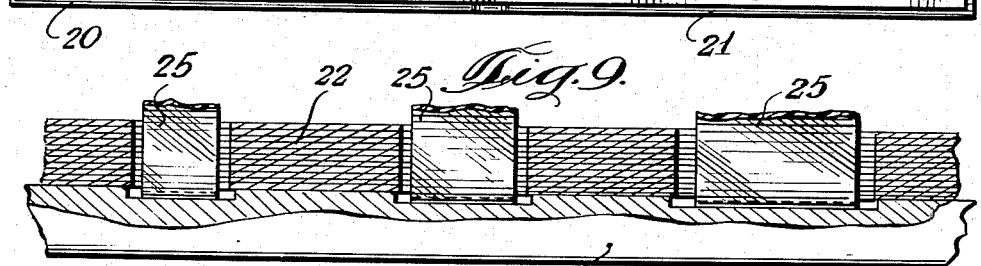
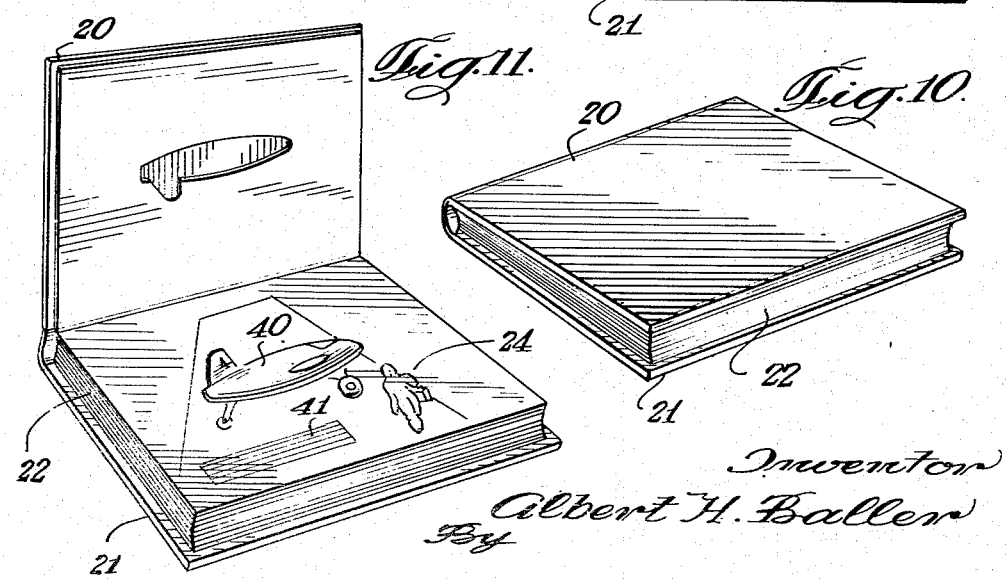
Inventor
Albert H. Baller
By
Attorneys Sept. 21, 1954     A. H. BALLER     2,689,751
BOOK NOVELTY
Filed March 16, 1951                    4 Sheets-Sheet 4
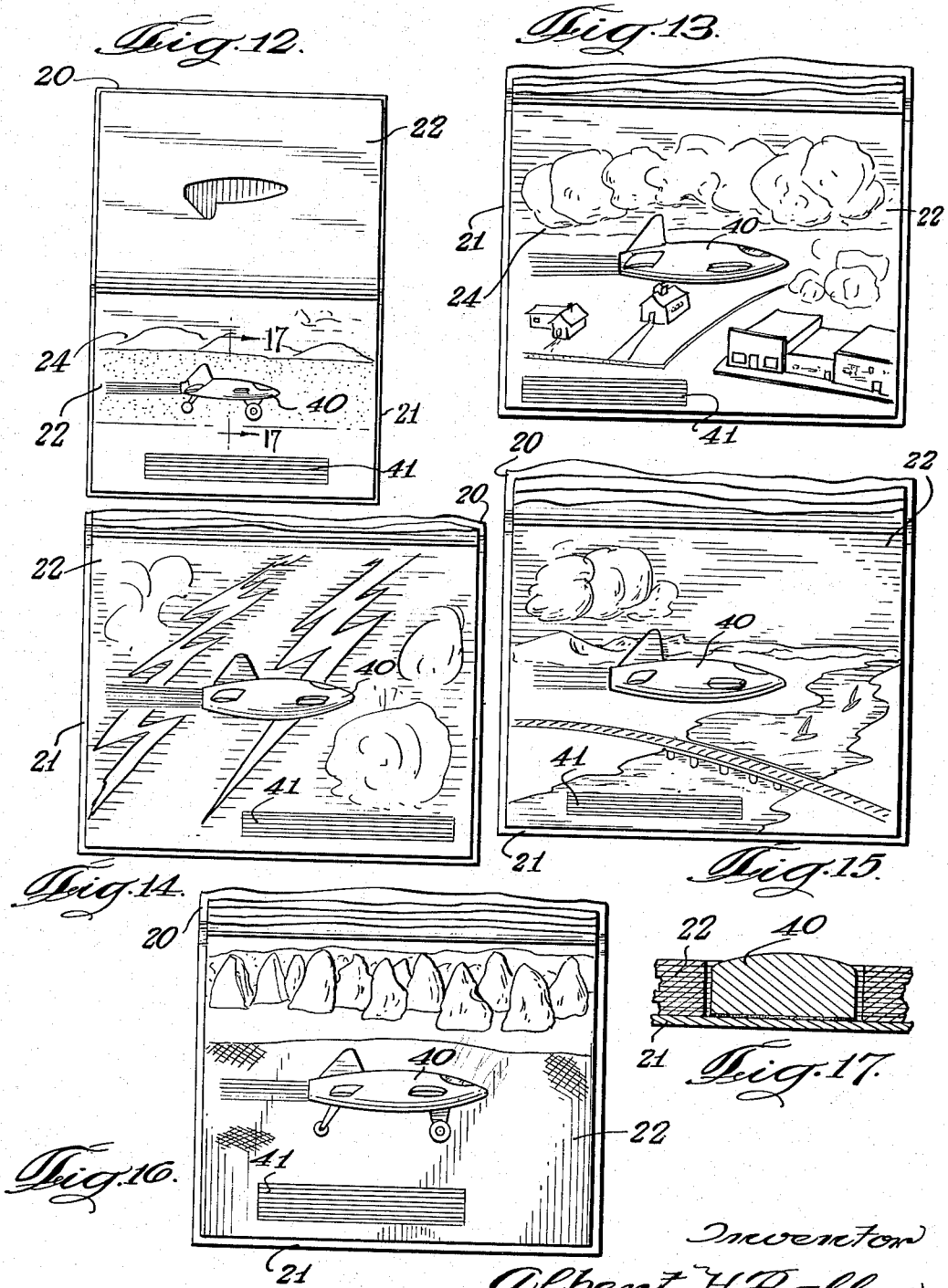
Inventor
Albert H. Baller
By
Attorneys

Patented Sept. 21, 1954

2,689,751

UNITED STATES PATENT OFFICE 2,689,751

BOOK NOVELTY

Albert Henry Baller, Heath, Mass., assignor to Rand McNally & Company, a corporation of Illinois Application March 16, 1951, Serial No. 216,057

9 Claims. (Cl. 283—63)

This invention relates to a novel book, particularly adapted to appeal to children, and more particularly to a novel book in which an article or animal appears on all of the pages of the book as the pages are turned.

It is an object of this invention to provide a book in which an article or animal having the form or appearance of a three-dimensional object appears on the pages of a book as the pages are turned; another object of the invention is to provide a book having apertured pages in register through which a figure extends; a further object of this invention is to provide a book in which the same figure may appear in a different setting or environment on a number of pages during the reading period; a further object of this invention is to provide a book having pages with apertures in register through which a figure attached to a flexible member may be threaded whereby the figure is pulled through the aperture on each page as it is turned in a manner simulating the jumping of said figure to a different environment on each succeeding page; a further object of this invention is to provide a book having a number of pages with apertures in register and a three-dimensional figure extending upward through the apertures whereby the figure may be illustrated in different environments as the pages are turned; a still further object of this invention is to provide a book having a plurality of pages each of which has a plurality of apertures in register with a plurality of apertures on other pages whereby figures may be extended or threaded through said apertures and may thereafter appear on each page as the preceding page is turned; another object of this invention is to provide a book having a plurality of pages with apertures in register, an elongated piece of flexible material, as plastic, connected to one of the pages near the back of the book and threadable through the apertures, a figure on the projecting end of the elongated plastic, and a sounding apparatus on the page of the book to which the elongated plastic is anchored whereby the figure and plastic may be threaded through the apertures and will appear on each page as it is turned until the last page is reached where the figure will strike the sound emitting apparatus.

Other features and advantages of this invention will be apparent from the following specification and the drawings, in which:

Fig. 1 illustrates a plan view of a book opened to the first apertured page and showing one embodiment of this invention wherein the figure of a grasshopper attached to a piece of flexible plastic has been threaded through the apertures in the pages of the book;

Fig. 2 is a view from the bottom of the pages of the book shown in Fig. 1 illustrating the action of the piece of elongated flexible plastic as the pages are turned;

Fig. 3 is a view similar to Fig. 2 except that the page has been turned through a greater angle;

Fig. 4 is an enlarged view, partially in section, showing the manner in which the figure is threaded through the apertures in the book pages, and also showing a noise emitting apparatus which is struck by the figure after the last apertured page has been turned;

Fig. 5 is an enlarged broken view, partially in section, taken along the lines 5—5 of Fig. 4, of the portion of the book to which the flexible plastic and noise emitter are connected;

Fig. 6 is a sectional view similar to Fig. 4 showing the action of the figure and elongated flexible plastic as the last apertured page is turned;

Fig. 7 is an enlarged sectional view taken along the lines 7—7 of Figs. 3 and 4 showing the way in which the piece of flexible plastic is threaded through the apertures in the pages;

Fig. 8 illustrates a modification of the invention in which each page has three apertures lined up therein and there are three figures attached to elongated flexible members extending through the apertures;

Fig. 9 is an enlarged sectional view taken along the lines 9—9 of Fig. 8;

Fig. 10 shows a naturally appearing closed book embodying this invention;

Fig. 11 illustrates a book having still another embodiment of this invention with front cover opened;

Fig. 12 illustrates the additional embodiment of this invention with the book open to one of the center pages;

Figs. 13, 14, 15 and 16 illustrate the manner in which the same three dimensional figure may appear in different environments as the pages of the book are turned;

Fig. 17 is an enlarged broken sectional view taken along the lines 17—17 of Fig. 12 showing the manner in which the same three dimensional object appears on all of the pages of the book as the pages are turned; and Fig. 18 is a fragmentary elevational view of the end of the flexible plastic with a three dimensional figure mounted thereon.

Referring to Figs. 1–7, a book having a front cover 20 and back cover 21 contains a number of pages 22, one side of which may contain indicia 23 and the other side of which may be illustrated as shown at 24.

Referring particularly to Fig. 5, the back cover 21 or one of the pages 22 near the back cover has fastened thereto at a point near the binding a piece of elongated material 25. The elongated material 25 may be made of a strip of thin springy plastic material and is preferably transparent. However, a piece of thin springy metal would likewise be satisfactory. In the embodiment shown, the thin elongated material is shown as being fastened by a pair of screws 26. However, it is obvious that any means which will firmly maintain the tip of the material in position will be satisfactory. When such a device is hereafter referred to as attached to a back "page," this is intended to include attachment to a back cover, fly leaf, or page.

At the other end of the elongated springy material, a figure 27 such as a grasshopper is attached. It is desirable to have the figure 27 relatively flat in order that it may lie substantially flat when the book is closed, but a certain thickness in order to impart a three dimensional appearance is desirable. As shown in Fig. 18, the representation of the grasshopper 27′ may have a thickened contour to accentuate the three dimensional effect.

A number of the pages 22 have rectangular apertures indicated at 28 arranged in register and lined up with the member 25 so that the member 25 with the figure 27 may be threaded therethrough. As shown in Fig. 1, the figure 27 is a grasshopper which has just emerged from his "grasshopper's house." The page succeeding the page illustrated in Fig. 1 will have a different illustration and the grasshopper may be projected into this new setting by turning the page shown in Fig. 1 as illustrated in Figs. 2 and 3. In Fig. 2 the page is illustrated being gradually advanced and the member 25 is shown as nearing the position where it will swing free of the page. In Fig. 3, the member 25 is shown in the position it assumes just prior to the time it swings free and then just afterward when it has snapped down in order to position the figure 27 in a different environment on a succeeding page. On this page the indicia 23 is also changed in order to carry forward the narrative. As succeeding pages are turned, the end of the narrative is reached and the last apertured page is turned. At this point the figure 27 may be arranged to contact a noise emitter 30. The noise emitter 30 may be a bell, a piece of stretched parchment to give a drum sound, or similar article.

When the last page is reached, it is necessary to thread the figure 27 through the apertures 28 in order to reset the book for another reading; and the sound may be used to provide an indication of this, and may call the attention of an adult, as a parent or teacher, to the fact that a child has finished the book.

In Fig. 8 an embodiment is shown wherein each page has a plurality of apertures 28 through which elongated flexible members 25 having figures 27 at one end thereof may be threaded. This embodiment allows a variation in the story and the various figures 27 do not need to be anchored to the same back cover so that the story may provide for their disappearance one by one as the story progresses.

In the embodiment shown in Figs. 11 to 17 a stationary figure 40 having more pronounced three dimensional characteristics than the figure 27 is fixedly connected to the back cover 21 or to one of the pages 22 near the end of the book. In the embodiment shown, the figure 40 is in the form of a side view of an airplane which protrudes through a series of registered apertures in the pages having an outline corresponding to the fuselage. As shown in Figs. 11–16, the turning of the pages shows the figure 40 in different environments which are explained by indicia 41 in narrative form as the pages are turned. In the embodiment shown in Figs. 11–17 it is not necessary to go through a threading operation when the end of the story is reached.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A book comprising a plurality of pages, an elongated springy member one end of which is attached near the binding of a page spaced from the front of said book, and a plurality of apertures in register in the pages preceding the page to which said elongated member is attached, said apertures being lined up with said elongated member whereby said elongated member may be threaded through said apertures.

2. A book of the character described comprising: front and back covers and a plurality of pages therebetween; an elongated springy member, one end of which is attached near the binding of a page spaced from the front of said book; a plurality of apertures in register on the pages preceding the page to which said elongated member is attached, said elongated member and said apertures being positioned whereby said elongated member may be threaded through said apertures; and a three-dimensional figure fixedly attached to the free end of said elongated member.

3. A book novelty of the character described comprising: a plurality of pages; a transparent strip of springy plastic attached near the binding of a page near the back of said book; a plurality of registered apertures in the pages preceding the page to which said plastic material is attached disposed for having said plastic material threaded therethrough; and a form mounted on the free end of said plastic material, said form being threadable through said apertures along with said plastic.

4. In a book of the character described: a plurality of pages; a piece of elongated springy material attached near the binding of one of the pages near the back of said book, said elongated material extending along said page parallel with the lines of printed material normally appearing in books; a plurality of registered apertures in the pages preceding the page to which said elongated material is attached, whereby said elongated material may be threaded through said apertures; and a form representing a natural object attached to the free end of said elongated material.

5. A book of the character described comprising: a plurality of pages; a front and back cover for said pages; an elongated springy strip attached to said back cover near the binding thereof and extending toward the outer edge of said cover at right angles to the binding; a plurality of registered apertures in said pages through which said thin strip is threadable; and a representation of a conventional object on the free end of said thin strip.

6. In a book of the character described: a plurality of pages; a front and back cover for said book; a thin strip of transparent springy plastic attached to said back cover near the binding thereof; and a plurality of registered apertures in said pages through which said strip of plastic may be threaded.

7. A book as claimed in claim 1 in which the back cover has a sound emitting device therein positioned under the free end of said strip of plastic material.

8. A book as claimed in claim 2 in which there are a plurality of thin strips extending through a plurality of registered apertures in said pages.

9. A book as claimed in claim 3 in which there are a plurality of thin strips extending through a plurality of registered apertures in said pages.

References Cited in the file of this patent

UNITED STATES PATENTS

| Number | Name | Date |
| --- | --- | --- |
| 1,011,833 | Newell | Dec. 12, 1911 |
| 1,028,921 | Wagner | June 11, 1912 |
| 1,112,813 | Lane | Oct. 6, 1914 |
| 1,689,637 | Mordecai | Oct. 30, 1928 |
| 2,136,326 | Spandorfer | Nov. 8, 1938 |
| 2,548,043 | Muhlhauser | Apr. 10, 1951 |